United States Patent
Fage

Patent Number: 5,956,939
Date of Patent: Sep. 28, 1999

[54] BYPASS JET ENGINE WITH CONFLUENT NOZZLE, ROTATING MEMBERS WHICH CONTROL THE BYPASS AIR FLOW AND A THRUST REVERSER WHICH CONTROLS THE VARIABLE EXHAUST AREA

[76] Inventor: Etienne Fage, "Le Moulin" 31, Avenue des Cistes, 83350 Ramatuelle, France

[21] Appl. No.: 08/958,345

[22] Filed: Oct. 27, 1997

[30] Foreign Application Priority Data

Nov. 12, 1996 [FR] France .................................. 96 13728

[51] Int. Cl.⁶ ............................. F02K 1/10; F02K 1/56; F02K 3/02
[52] U.S. Cl. .................... 60/226.2; 60/271; 239/265.19; 239/265.29; 244/110 B
[58] Field of Search ................................... 60/226.2, 230, 60/271; 239/265.19, 265.27, 265.29, 265.31; 244/110 B

[56] References Cited

U.S. PATENT DOCUMENTS

| | | | |
|---|---|---|---|
| 2,669,934 | 2/1954 | Helms, Jr. ................................. | 60/35.5 |
| 2,972,860 | 2/1961 | Moy ........................................ | 60/35.55 |
| 3,024,771 | 3/1962 | Criffield et al. ........................... | 60/271 |
| 4,073,440 | 2/1978 | Hapke ................................. | 239/265.29 |
| 4,581,890 | 4/1986 | Giraud ....................................... | 60/230 |
| 4,930,308 | 6/1990 | Fage ......................................... | 60/262 |
| 4,966,327 | 10/1990 | Fage et al. .......................... | 239/265.25 |
| 5,181,676 | 1/1993 | Lair ........................................ | 60/226.2 |
| 5,192,023 | 3/1993 | Fage et al. ............................... | 239/11 |
| 5,372,006 | 12/1994 | Lair ....................................... | 60/226.2 |
| 5,495,710 | 3/1996 | Servanty ................................ | 60/226.2 |
| 5,685,141 | 11/1997 | Markstein et al. ................. | 239/265.19 |

FOREIGN PATENT DOCUMENTS

| | | |
|---|---|---|
| 0 717 184 A1 | 6/1996 | European Pat. Off. . |
| 1306025 | 9/1962 | France . |
| 1330633 | 5/1963 | France . |
| 2456216 | 12/1980 | France . |
| 2551132 | 3/1985 | France . |
| 2728306 | 6/1996 | France . |
| 985192 | 3/1965 | United Kingdom . |
| 1435946 | 5/1976 | United Kingdom . |

*Primary Examiner*—Ted Kim
*Attorney, Agent, or Firm*—Fisher, Christen & Sabol

[57] ABSTRACT

A bypass jet engine which includes a confluent nozzle (8) and a thrust reverser (7), controlled means (14) arranged at the periphery of the confluent nozzle (8) adjacent to the mouth of an annular bypass duct (4) and inside this nozzle to vary the confluence cross section. The bypass jet engine also includes means of shifting the pivot pins (20) of the reverser doors (7) in order to reduce the cross section of the outlet orifice of the nozzle when the controlled means (14) of varying the confluence cross section increase the confluence cross section and, conversely, to increase the cross section of the outlet orifice of the nozzle when the controlled means (14) reduce the confluence cross section.

11 Claims, 8 Drawing Sheets

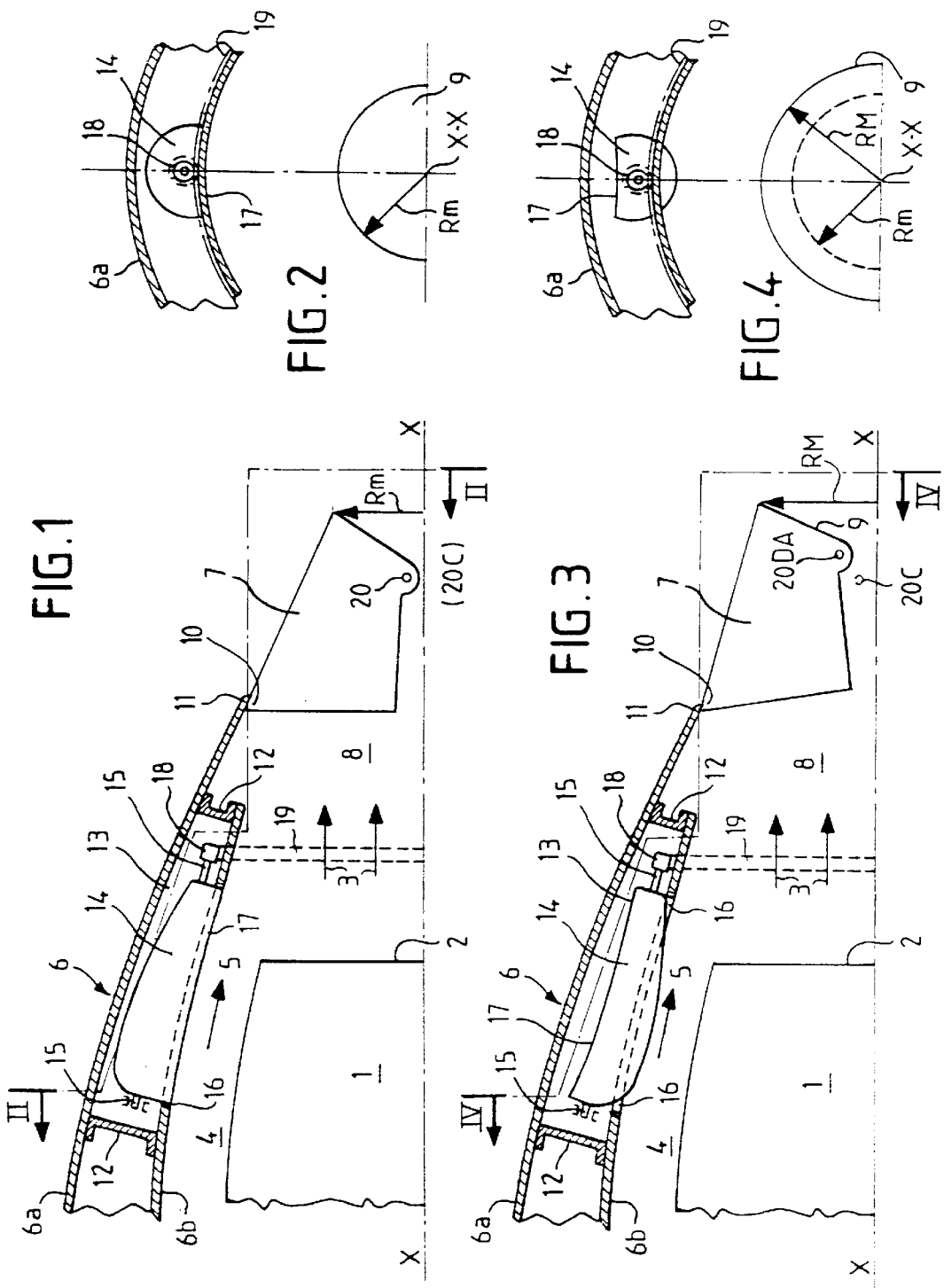

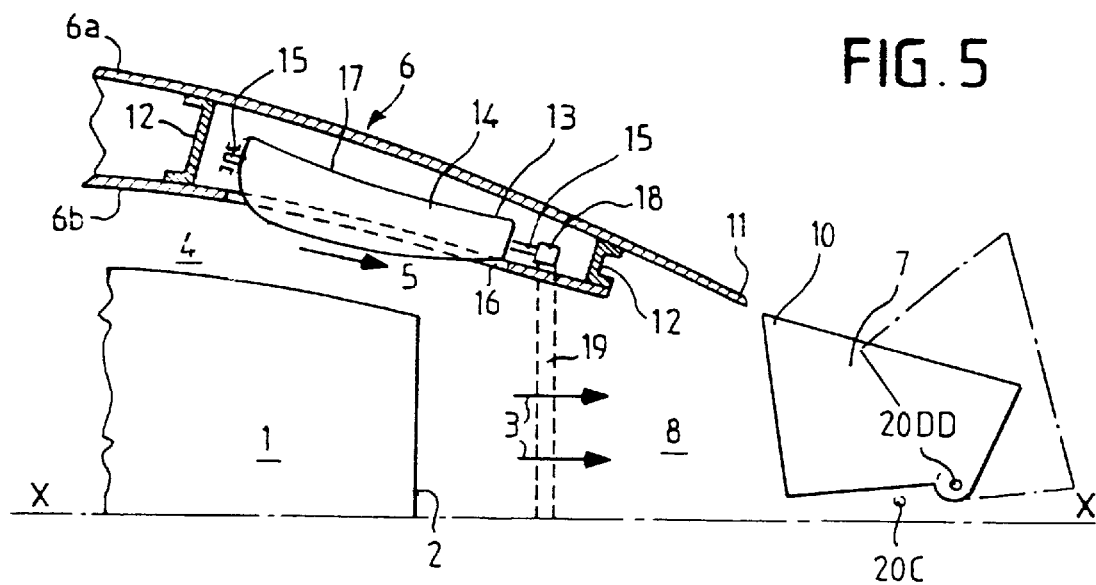
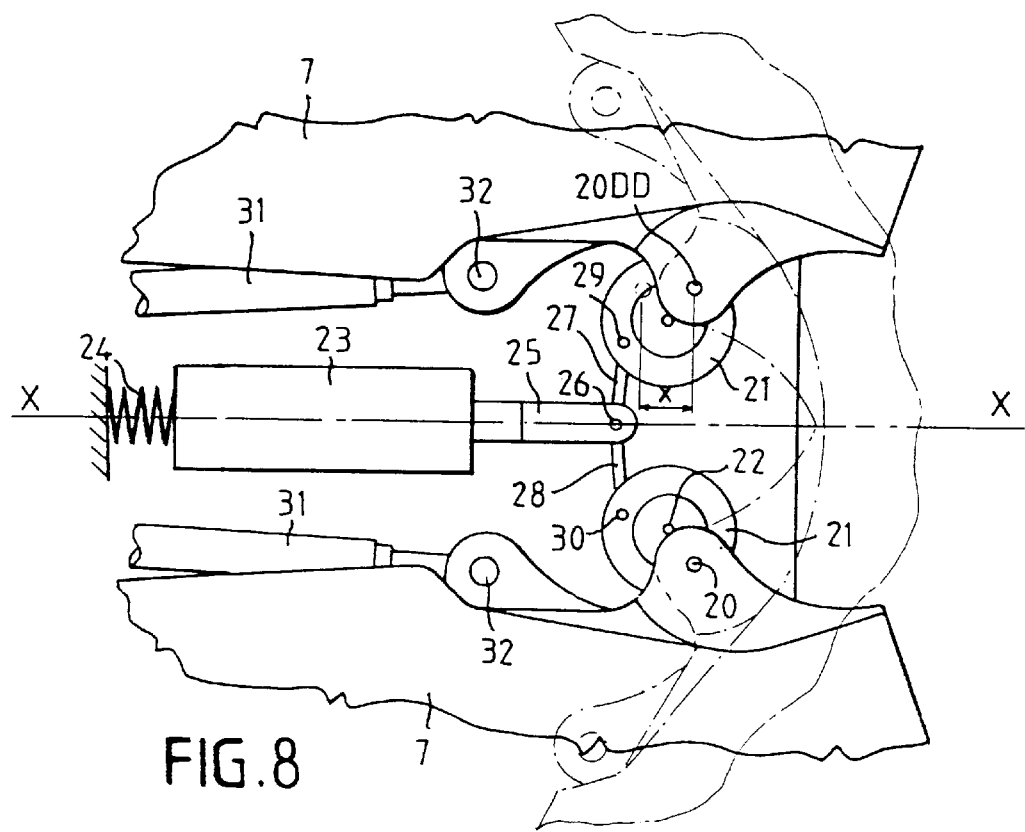

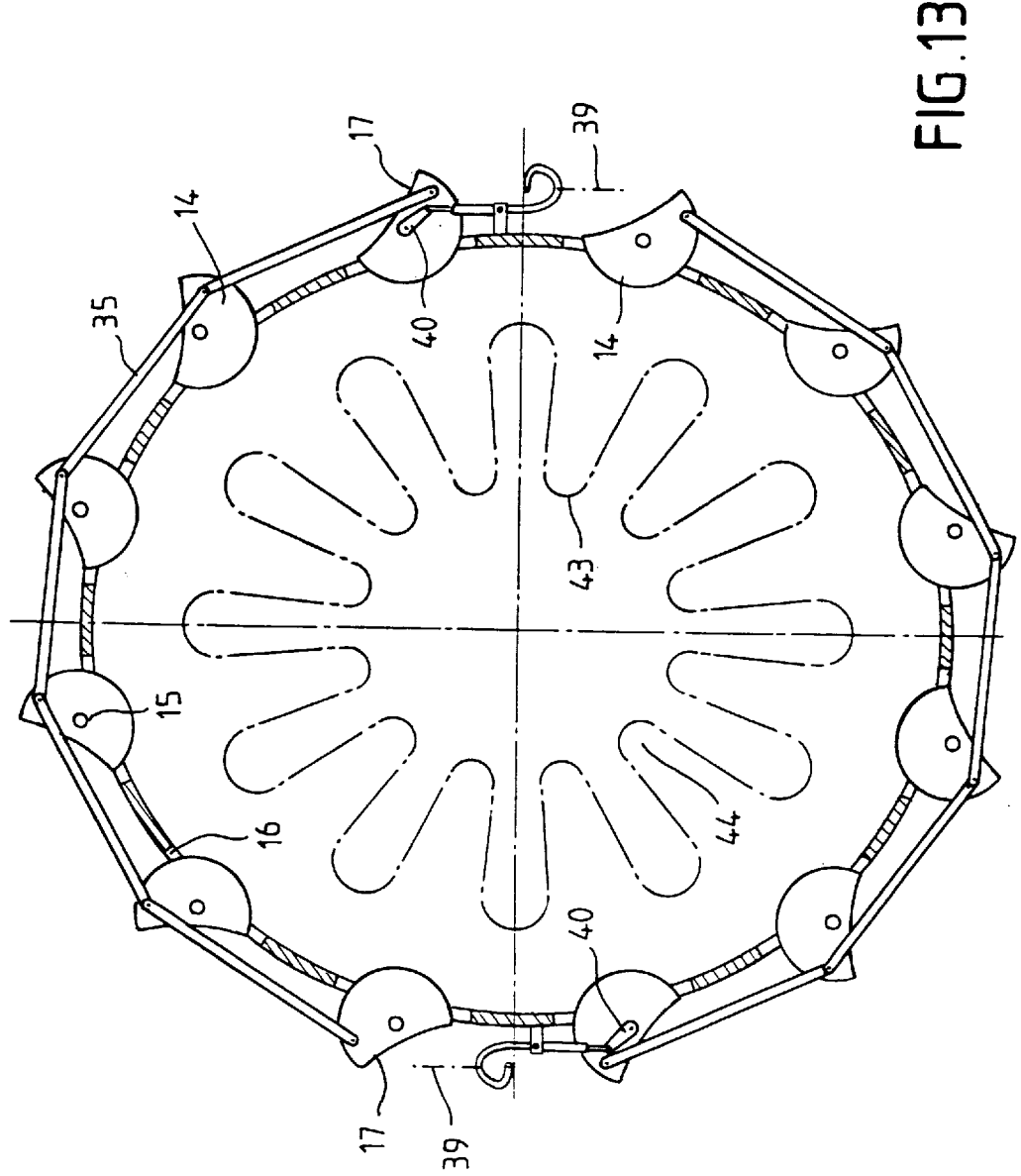

BYPASS JET ENGINE WITH CONFLUENT NOZZLE, ROTATING MEMBERS WHICH CONTROL THE BYPASS AIR FLOW AND A THRUST REVERSER WHICH CONTROLS THE VARIABLE EXHAUST AREA

BACKGROUND OF THE INVENTION

1. Field of the Invention

The present invention relates to a bypass jet engine with confluent nozzle, specially intended for aircraft propulsion and equipped with a thrust reverser.

GENERAL DESCRIPTION OF THE INVENTION

2. Description of Related Art

It is known that a bypass jet engine comprises a central generator which emits a stream of hot gas and an annular bypass duct (fan duct) surrounding said central generator and through which a bypass stream of relatively cold gas originating from a fan passes. A jet engine of this type is equipped with a single nozzle which extends said annular duct toward the outside beyond the outlet orifice of said central generator and inside which the two streams, both the hot stream and the cold stream, are freely confluent. In such a nozzle, said to be confluent or compound, the hot stream from the central generator is surrounded by the cold bypass stream from the fan. In a jet engine of this type, the ratio of the flow rate of cold stream to the flow rate of hot stream (dilution ratio) varies commonly between 3 and 6.

Since, within the confluent nozzle, there is no solid surface separating the two streams, the respective cross sections of the streams at the outlet of said common confluent nozzle are the result not only of the nozzle geometry but also of the pressure balance along the fluid surface (interface) separating the two streams. It will be readily understood that if, for example, the pressure of the cold bypass stream increases, the hot central stream will have to be compressed radially: thus, in such a case, the annular outlet cross section of the cold stream will increase, while the central outlet cross section of the hot stream will decrease.

Of course, for a given engine, these variations in relative cross section will depend on the conditions in which said engine is operating, such as the speed and altitude of the aircraft, and the temperature of the ambient air, for example, and on the position of the throttle and will not exactly coincide with the optimum dimensions that allow the best possible engine performance to be obtained.

It will be observed that for most uses, such relative variations in cross section of the streams compared with the ideal cross sections that give the optimum performance are not too detrimental because they are compensated for in part by the operating flexibility of bypass engines.

However, in general, the maximum thrust developed by these engines corresponds either to obtaining a limiting operating temperature or to a limiting rotational speed (limiting speed), it being only in exceptional cases that these two limits coincide. Thus in the particular important case of take-off thrust at high ambient temperature, it is common for this thrust to be defined by the limiting temperature, even though the rotational speed is well below the limiting speed.

To allow a jet engine of this kind to have operating conditions which are as close as possible to the ideal conditions, document FR-A-2 602 550 (which corresponds to document U.S. Pat. No. A-4,930,308) envisages, at the periphery of the annular bypass duct, at the place where this duct opens into the confluent nozzle, controlled means, such as moving bodies or flaps which can, in a controlled manner, reduce the confluence cross section and the outlet cross section for the cold stream and therefore, as a result, increase the outlet cross section for the hot stream, which leads to a drop in the operating temperature of the gas generator and makes it possible for the speed of the jet engine to increase. However, it has been observed that such a reduction in the outlet cross section for the cold stream could lead to the risk of surging of the fan, and so engine designers forbade its use for controlling the operating conditions of bypass jet engines.

From another source, documents FR-A-2 614 939 (which corresponds to the documents U.S. Pat. No. A-4,966,327 and U.S. Pat. No. A-5,192,023) and FR-A-2 728 306, there is already known a bypass jet engine with confluent nozzle which additionally comprises:

a thrust reverser comprising at least two doors each of which is mounted so that it can pivot about a pin which is transversal to the stream of said engine, and which is arranged downstream of said confluent nozzle, so that each door can occupy either a folded position for which it forms part of the cowling of said jet engine or part of the aircraft fuselage, or a deployed position for which it is arranged transversely to said streams, said doors together in addition when in the folded position forming at least part of said confluent nozzle;

actuating means to make said reverser doors simultaneously adopt either their folded position or their deployed position; and means for shifting the transverse pins of said doors both together and radially to said streams when these doors are in the folded position.

Thus, thanks to an arrangement of this kind, it is possible to vary the outlet orifice for the gases from the jet engine using the thrust reverser when said doors are folded, that is to say when the jet engine is operating as a direct jet. Consequently, by bringing the reverser to the folded position, this outlet orifice could be adapted to best suit the corresponding phase of flight. What actually happens is that varying the cross section of this outlet orifice of the jet engine causes a simultaneous variation in the outlet cross section for the hot stream and a variation in the outlet cross section for the cold stream.

The thrust reverser would therefore, in addition to fulfilling its fundamental role of providing braking on the ground, make it possible, somewhat paradoxically, to improve flight, take-off and landing performance.

However, if the actual operation of modern confluent nozzles, in which the dilution ratio is between 3 and 6 is studied, one cannot fail to observe that increasing the cross section of the outlet orifice of the jet engine leads essentially to an increase in the outlet cross section for the cold stream and, only as a secondary effect, to an increase in the outlet cross section for the hot stream.

Now, as was mentioned above, it is only an increase in the outlet cross section for the hot stream that makes it possible to reduce the operating temperature of the hot gas generator for a given fan speed and therefore to increase the speed of the jet engine until the hot gas generator operating temperature regains its limiting value, that is to say to increase the thrust of the jet engine.

Increasing the outlet cross section for the cold stream on the other hand has only a detrimental effect because it generally causes the fan to run at a lower efficiency.

Thus, contrary to the teaching of document FR-A-2 614 939, it is clear that good adaptation of the confluent nozzle cannot be attained simply by adjusting the cross section of the outlet orifice of the jet engine.

The object of the present invention is to overcome these drawbacks and make it truly possible to use the thrust reverser, in its folded position, to improve the performance of the jet engine.

For this, according to the invention, the bypass jet engine with confluent nozzle for an aircraft:

comprising a central generator which through its outlet orifice emits a stream of hot gas, and an annular bypass duct which surrounds said central generator and through which a stream of relatively cold gas passes, said streams of hot and cold gas being freely confluent inside said nozzle, which extends said annular duct beyond the outlet orifice of said central generator to form a convergent nozzle, said annular bypass duct defining the confluence cross section in the plane of the outlet orifice of the central generator;

equipped with a thrust reverser comprising:

at least two reverser doors, each of which is mounted so that it can pivot about a pivot pin which is transversal to said streams from the jet engine and which is arranged close to the outlet orifice of said confluent nozzle, so that each reverser door can occupy either a folded position in which it forms part of the cowling of said jet engine or part of the aircraft fuselage, or a deployed position in which it is arranged transversely to said streams, said reverser doors in the folded position forming at least that part of said confluent nozzle which is adjacent to its outlet orifice; and actuating means to make said reverser doors simultaneously adopt either their folded position or their deployed position; and comprising controlled means arranged at the periphery of said confluent nozzle, adjacent to the mouth of said annular bypass duct and inside this nozzle, to vary said confluence cross section, is noteworthy:

in that it comprises means for shifting both together, and radially to said streams, the transverse pivot pins of said reverser doors when these doors are in the folded position, so as to vary the cross section of the outlet orifice of said confluent nozzle; and in that said means of shifting the pivot pins of the reverser doors reduce said cross section of the outlet orifice of the nozzle when said controlled means of varying the confluence cross section increase said confluence cross section and, conversely, increase said cross section of the outlet orifice of the nozzle when said controlled means reduce said confluence cross section.

It is thus possible to increase the outlet cross section for the hot stream by reducing the confluence cross section, while at the same time avoiding any surge at the fan thanks to the fact that the outlet cross section for the cold stream is maintained by increasing the cross section of the outlet orifice of the nozzle. In other words, associated with the control of the confluence cross section, there is limited control over the outlet cross section of the nozzle, this being just enough to avoid any reduction in the outlet cross section for the cold stream.

Looking at the characteristics of confluent nozzles with dilution ratios of the order of 3 to 6, it can be seen that a reduction by about 13% in the confluence cross section leads to an increase by about 1.5% in the outlet cross section for the hot stream, that the corresponding reduction in outlet cross section for the cold stream can be compensated for by an increase by about 2% in the cross section of the outlet orifice of the nozzle and that this last increase itself raises the increase in outlet for hot gases from 1.5% to 2%. All the percentages mentioned here are with respect to the total cross section of the outlet orifice of the nozzle.

It will also be observed that such an increase in the outlet cross section for the hot stream would require an increase by about 10% in the cross section of the outlet orifice of the nozzle, without reducing the confluence cross section, something which is practically impossible to achieve. This is because on the one hand, the space required by the mechanisms for controlling the cross section of the outlet orifice of the nozzle would exceed the space normally available, necessitating protrusions which aerodynamically speaking are a nuisance. Furthermore, the reverser doors would not be able to ensure satisfactory continuity of the internal and external surfaces, in both folded positions required by such a large variation in outlet cross section of the nozzle. The sealing which is indispensable would be practically impossible to achieve. Finally, the considerable (+8%) increase in outlet cross section for the cold stream which would result from this would lead in most cases to an inacceptable loss of thrust.

Thus, the use of simultaneous control, in accordance with the present invention, of the confluence cross section and the cross section of the outlet orifice of the nozzle has a synergistic effect which allows the jet engine performance to be influenced in an effective way.

It goes without saying that it would be possible, in the jet engine according to the invention, to envisage adjustment which could give said outlet cross section of the nozzle a number of values between a minimum value and a maximum value and give the confluence cross section the same number of values between a maximum value and a minimum value.

However, in a simple and advantageous embodiment of the present invention, it is merely envisaged that said means of shifting the transverse pivot pins of the reverser doors give these doors, in the folded position, two different stable positions, the first of which corresponds to a maximum cross section of nozzle outlet orifice designed for take-off and landing, and the second of which corresponds to a minimum cross section of nozzle outlet orifice designed for cruising flight, whereas said controlled means of varying the confluence cross section give said confluence cross section a minimum value in said first position designed for take-off and landing and a maximum value in said second position designed for cruising flight.

As a preference, along the axis of said jet engine, said first position is part way between said second position and the pulled back deployed position of said reverser doors.

Advantageously, said controlled means of variation consist of a number of individual moving bodies, preferably shaped, distributed around the periphery of said annular bypass duct.

The number and size of these shaped individual bodies are adapted to suit each specific jet engine and the envisaged conditions in which it will be used. Control of these individual moving bodies, that it to say bringing them out into the annular bypass duct or retracting them out of this duct may be collective (in this case they are all controlled simultaneously in the same way) or individual. They may also be controlled in individual groups. Furthermore, these individual moving bodies may be uniformly spaced about the axis of the engine, or alternatively be concentrated in a specific circumferential region of said bypass duct.

Said individual moving bodies can advantageously be moved between a retracted position, in which they are housed within the thickness of the outer wall of said annular duct and provide said wall with its continuity, and a deployed position in which they project into said annular duct. In this case, it is advantageous for said individual moving bodies to move from one of their positions to the other by rotating.

When, as is known, the confluent nozzle comprises means of mixing the hot and cold streams, which means consist of convolutions made at the periphery of the exhaust nozzle of the central generator and each pair forming between them a passage for guiding gas from the cold stream toward the hot stream, it is advantageously the case that, in the deployed position, each of said individual moving bodies comes to face one of said guide passages.

As described above, said moving bodies should not be made to move from their retracted position into their deployed position except at the same time as the cross section of the outlet orifice of the nozzle is being increased, this being in order to avoid any risk of surge.

Said moving bodies and the means of shifting the pivot pins of the reverser doors may be controlled individually, possibly with some form of synchronizing.

However, because said moving bodies have only light aerodynamic loading, a separate control for said moving bodies advantageously need not be provided, the pivoting of said moving bodies being slaved mechanically to the shifting of the pivot pins of the reverser doors. Thus advantageously, means of mechanical coupling between said means of shifting the pivot pins of the reverser doors and said controlled means of varying said confluence cross section (rotary bodies) are provided.

Such means of mechanical coupling may comprise at least one pull cable.

As a preference, said means of shifting the pivot pins of the doors and said means of mechanical coupling act against elastic means pressing said doors toward their first position and said moving bodies toward their deployed position, so that, should one of said coupling means fail, the configuration best suited to low-speed flight (large cross section of the nozzle outlet orifice and small confluence cross section) is automatically ensured.

The jet engine in accordance with the present invention is of the type described in documents FR-A-2 728 306 and EP-A-0 717 184, in which the reverser doors are brought, in order to deploy them, into a pulled back position in which radial stop means designed to interact with the front end of said doors to prevent them from deploying, become inactive, such radial stop means advantageously being formed, on the one hand, by the front edge of said reverser doors and, on the other hand, by the rear edge of the upstream part of said jet engine, said front edge of the doors being designed to fit at least locally under said rear edge of said upstream part of the engine.

Thus, said radial stop means allow the transverse pivot pins to be shifted between said first and second positions, and the present invention can benefit from the principle of unlatching the reverser doors by pulling them back.

Furthermore, it is advantageously the case, in the jet engine in accordance with the present invention, that said means of shifting the transverse pivot pins of the reverser doors comprise, for each reverser door, two rotary pivot holders each held by a rotation spindle secured to the jet engine and each carrying an eccentric pivot, the two pivots of said pivot holders being aligned to define the transverse pivot pin for the corresponding reverser door. In this case, said first take-off and landing position, said second, cruising flight, position, and said pulled back unlatched and deployed position of the reverser doors correspond, for each reverser door, to three angular positions of their corresponding pivot holders about their rotation spindles.

It will be observed that the technique of varying the cross section of the outlet orifice of the nozzle, as described in document FR-A-2 614 939, is incompatible with the principle of unlatching by pulling back. This is because to avoid mechanical interference between the stationary rear structure of the jet engine and the front edge of the doors as they are shifted between the two positions in direct jet mode, the technique of FR-A-2 614 939 requires the pivot pins of said doors to move back, when they pivot about their latching hooks in the direction for increasing the cross section of the outlet orifice of the nozzle. In one of the preferred embodiments of this prior document, which comprises a rotating pivot-holder disk, this means that the pins need to move around the rear sector of the rotary disk.

Unlatching by pulling back therefore becomes impossible.

By contrast, in the jet engine according to the present invention, which employs a structure of the kind described in EP-A-0 717 184, this difficulty disappears. This is because this structure envisages and organizes the sliding of the front edge of the doors under the rear edge of the stationary structure. There is therefore no mechanical interference when use is made of the front sector of the pivot-holder disk to change the outlet orifice of the nozzle from one cross section to another. What is more, the front edge of the doors permanently slides under the rear edge of the stationary structure, this in itself guaranteeing perfect continuity between the stationary and moving surfaces and minimizing the aerodynamic drag. By contrast, in the system in document FR-A-2 614 939, the defects in alignment between the surfaces, resulting from the rotation of the doors about their latching hooks, combine with the deformations of said doors under the effect of the aerodynamic loadings to generate a great deal of aerodynamic drag.

Furthermore, as regards the installation of said rotary bodies in the confluence region, it should be pointed out that this would be very difficult if there were already other mechanisms like the controlled hook latching systems of document FR-A-2 614 939 and the flaps for constricting the cold flow described in document FR-A-2 456 216 already present in this region.

These problems are not encountered in the jet engine of the invention, because there are no hooks for latching the doors in the folded position.

Furthermore, it can be observed that the rotary bodies used as described hereinabove to restrict the confluence cross section when the doors are folded are also deployed, when the reverser doors are deployed, which means that the passage for the stream of cold gas through the annular bypass duct is reduced. As is described in FR-A-2 456 216, this means that the stream of hot gases cannot, in reversed jet mode, come into direct contact with the structure of the reverser. This reverser can therefore be made of light materials, such as aluminum alloys or composite materials, and this considerably enhances the advantages of lightness of weight associated with the structure of the reverser of document EP-A-0 717 184.

It will also be observed that since said rotary bodies are rendered active when the reverser doors are in the deployed position, the backward movement of these prior to their deployment causes the back pressure which results from this deployment to drop, which means that there is no risk of surge at the fan.

Thus, far from constituting an additional complication, the installation of the rotary bodies in accordance with the invention therefore has the two fold advantage of, in direct jet mode, giving a truly optimized adaptation of the nozzle and, in thrust reversal mode, making it possible to replace completely the system of restricting flaps of FR-A-2 456 216, guaranteeing low temperature on said reverser doors.

BRIEF DESCRIPTION OF THE DRAWINGS

The figures of the appended drawing will make it easy to understand how the invention may be achieved. In these figures, identical references denote similar elements.

FIG. 1 is a diagrammatic half view in longitudinal section of the rear part of one embodiment of the jet engine in accordance with the present invention, in the position for cruising flight.

FIG. 2 is a view in transverse section on II—II of FIG. 1.

FIG. 3 is a diagrammatic half view in longitudinal section of the rear part of the jet engine of FIGS. 1 and 2, in the position for taking-off or landing.

FIG. 4 is a view in transverse section on IV—IV of FIG. 3.

FIG. 5 is a diagrammatic half view in longitudinal section of the rear part of the jet engine of FIGS. 1 to 4 in the position in which the reverser doors are unlatched and deployed.

FIGS. 6, 7 and 8 illustrate one embodiment of the mounting and control of the pivot pins of the reverser doors, respectively in the position for cruising flight, in the position for taking-off or landing, and in the position in which the reverser doors are unlatched and deployed.

FIG. 13 is a diagrammatic view of the rear of the jet engine, said rotary bodies being in a position that corresponds to taking-off, landing, and thrust reversal.

DETAILED DESCRIPTION OF THE INVENTION

Figure 6:
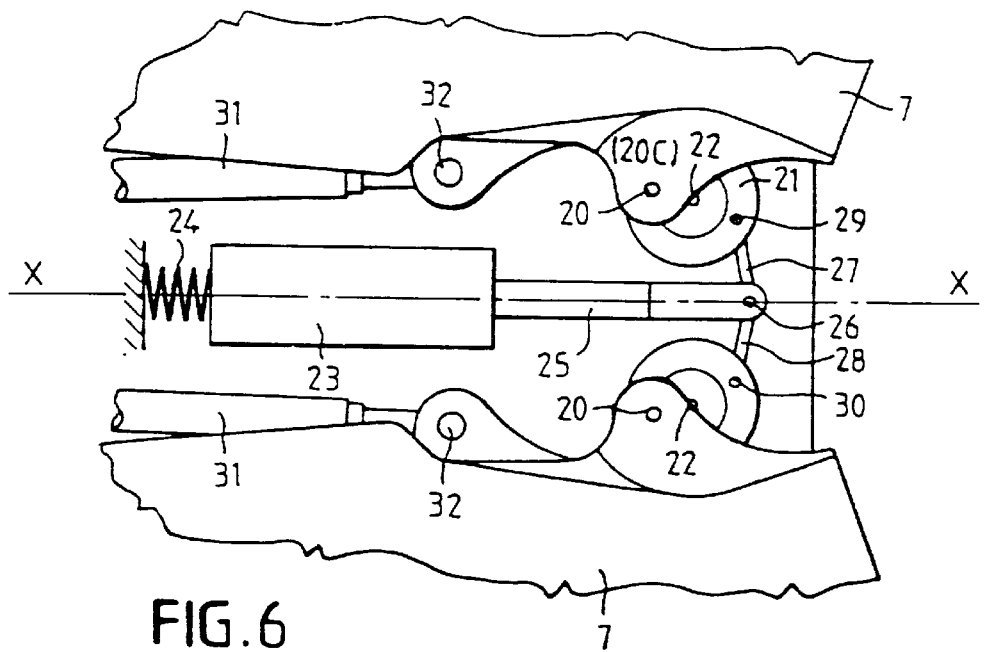

The rear part of the bypass jet engine of longitudinal axis X—X, shown diagrammatically in FIG. 1, has a central generator 1 which through its outlet orifice 2 emits a stream of hot gas (arrows 3) and an annular bypass duct 4 which surrounds said central generator 1 and through which a bypass stream of relatively cold gas (arrows 5) generated by a fan (not depicted) passes. The outer wall 6 of the annular duct 4 is extended, rearward, beyond the plane of the outlet orifice 2 of the central generator 1, by thrust-reverser doors 7 which, at least in part, form a confluent convergent nozzle 8 ending at the rear of the jet engine in an outlet orifice 9 (see also FIG. 2).

Thus the confluence cross section of the jet engine is defined by the annular cross section of the duct 4 in the plane of the outlet orifice 2 of the central generator 1.

The front edge 10 of the reverser doors 7 (also called leading edge) fits under the rear edge 11 of said outer wall 6.

This outer wall 6 comprises an outer skin 6a and an inner skin 6b which are held apart by frames 12.

Facing the outlet orifice 2 of the generator 1, the skins 6a and 6b and two consecutive frames 12 determine box structures 13 inside which shaped moving bodies 14 are mounted. Each of the bodies 14 is mounted so that it can pivot about pivots 15 journal-mounted in bearings secured to said box structures 13. These comprise, in the inner skin 6b, openings 16. Under the action of actuating means (described below), each of the shaped rotary bodies 14 can occupy a retracted position (see FIGS. 1 and 2), in which it is fully housed within the corresponding box structure 13 closing off said opening 16 with its face 17 which forms a continuous surface with the inner skin 6b, or a deployed position (see FIGS. 3 to 5) for which it projects into the annular bypass duct 4, passing through the corresponding opening 16. The shaped moving bodies 14 are therefore capable of varying the confluence cross section of the nozzle.

The shaped bodies 14 are changed from each of said positions to the other by rotating them about their pivots 15.

For this, the means of rotating the shaped bodies 14 may comprise a controlled member 17, such as a crank or a pinion, secured to the pivots 15 and a control member 19, such as a link or a ring gear interacting with the controlled members 17 of all or some of the shaped bodies 14.

Furthermore, the thrust reverser doors are mounted so that they can pivot about pins 20 orthogonal to the longitudinal axis X—X, and said pivot pins 20 are mounted so that they can move (in the way described below) so that they can be shifted, in a parallel translation either parallel to and/or transversely to said longitudinal axis X—X.

In accordance with an important feature of the present invention, there is a relationship between the positions of the shaped bodies 14 and the positions of the pivot pins of the reverser doors 7 (following the shifting of these pivot pins 20).

Thus in the embodiment depicted in FIGS. 1 to 5, the shaped bodies 14 and the reverser doors 7 may occupy three relative positions:

a) in the position depicted in FIGS. 1 and 2, which corresponds to cruising flight:
  the shaped bodies 14 are in retracted position; and
  the pivot pins 20 occupy their position 20C furthest forward, which means that the reverser doors 7 also occupy their position furthest forward toward the central generator 1, with their front edge 10 broadly engaged under the rear edge 11 of the outer wall 6.
  In this cruising position, the radius of the outlet orifice 9 of the nozzle takes a minimum value Rm;

b) in the position depicted in FIGS. 3 and 4, which corresponds to take-off and landing:
  the shaped bodies 14 are in the deployed position; and
  the pivot pins 20 occupy an intermediate position 20DA, further back and further away from the axis X—X than the position 20C, which means that said reverser doors are pulled back by comparison with FIGS. 1 and 2 but still with the front edge 10 of the reverser doors 7 still engaged under the rear edge 11.
  In this take-off and landing position, the radius of the outlet orifice 9 of the nozzle takes a maximum value RM;

c) in the position depicted in FIG. 5, which corresponds to the unlatching and deployment of the reverser doors 7:
  the shaped bodies 14 are in the deployed position; and
  the pivot pins 20 occupy a position 20DD even further back than the position 20DA, which means that the front edge 10 of said reverser doors comes free of the stop formed by the rear edge 11 of the jet engine and that it is possible for said doors to be deployed (see position in chain line).

Figure 7:
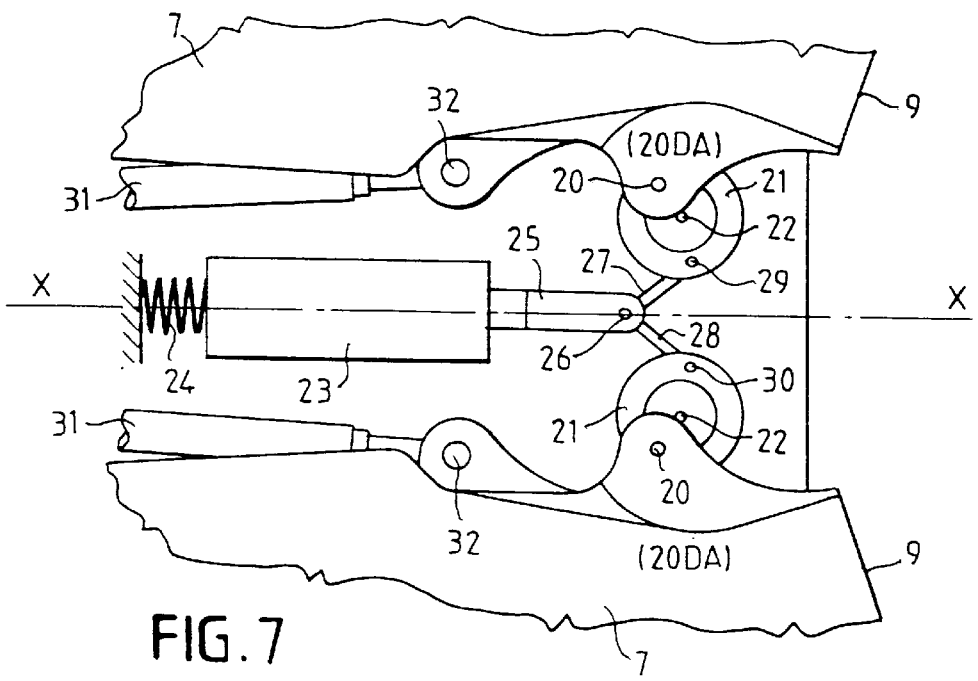

Illustrated in FIGS. 6, 7 and 8 is one way of mounting and controlling the pins 20 on the reverser doors 7, in the case of a thrust reverser with two diametrically opposed doors 7. This thrust reverser comprises main actuating jacks 33 (not depicted in these figures, but one of which can be seen in FIG. 9) capable of acting on said doors 7 via connecting rods 31 articulated to these doors at 32.

In this example, the pivots forming the transverse pivot pins 20 are mounted eccentrically on a rotary pivot holder 21, for example in the form of a disk, held by a rotation spindle 22 secured to the jet engine.

The two rotary pivot holders 21 associated, on one and the same side of the jet engine, with the two opposed reverser doors 7, are controlled by a common jack 23, possibly mounted elastically on the stationary structure of said jet engine. In the figures, this elastic mounting is symbolized by a spring 24.

The rod 25 of the jack 23 is coaxial with the axis X—X and, to its free end, are articulated (at 26) two small connecting rods 27 and 28 themselves articulated respectively (at 29 and at 30) respectively to the pivot holders 21 associated respectively with the two opposed doors 7, so as to allow said doors to be shifted simultaneously.

As shown in FIGS. 6, 7 and 8, the points 29 and 30 where the small connecting rods 27 and 28 are articulated to the rotary pivot holders 21 and the method 24 of elastic mounting are designed to be such that said small connecting rods can adopt three stable distinct positions which correspond respectively to the three positions of the pivot pins and of the reverser doors, illustrated in FIGS. 1 to 5.

A/ When the rod 25 of the jack 23 is deployed (see FIG. 6), the small connecting rods 27 and 28 are on the rear side of the pivot holders 21 and force the pivot pins 20 and therefore the reverser doors 7 to adopt their furthest forward position with a minimum cross section of the outlet orifice 9, as is illustrated diagrammatically in FIGS. 1 and 2. FIG. 6 thus corresponds to the cruising position.

B/ When the rod 25 of the jack 23 is retracted (see FIG. 7), the small connecting rods 27 and 28 come between the pivot holders 21 and force the pivot pins 20 and therefore the reverser doors 7 to adopt their intermediate position with a maximum cross section of outlet orifice 9, as is illustrated in FIGS. 3 and 4. FIG. 7 therefore corresponds to the take-off and landing position.

C/ When the rod 25 of the jack 23 is retracted and the connecting rods 31 push the doors 7 rearward (see FIG. 8), the small connecting rods 27 and 28 move to the front side of the pivot holders 21 and the pivot pins 20 and therefore the reverser doors 7 adopt their furthest back position, as is illustrated by FIG. 5. FIG. 8 therefore corresponds to the unlatching and deployment position. It will be noted that the change from the take-off and landing position into the unlatching and deployment position requires a temporary forward movement of the jack 23, which movement is absorbed by the spring 24.

Figure 9:
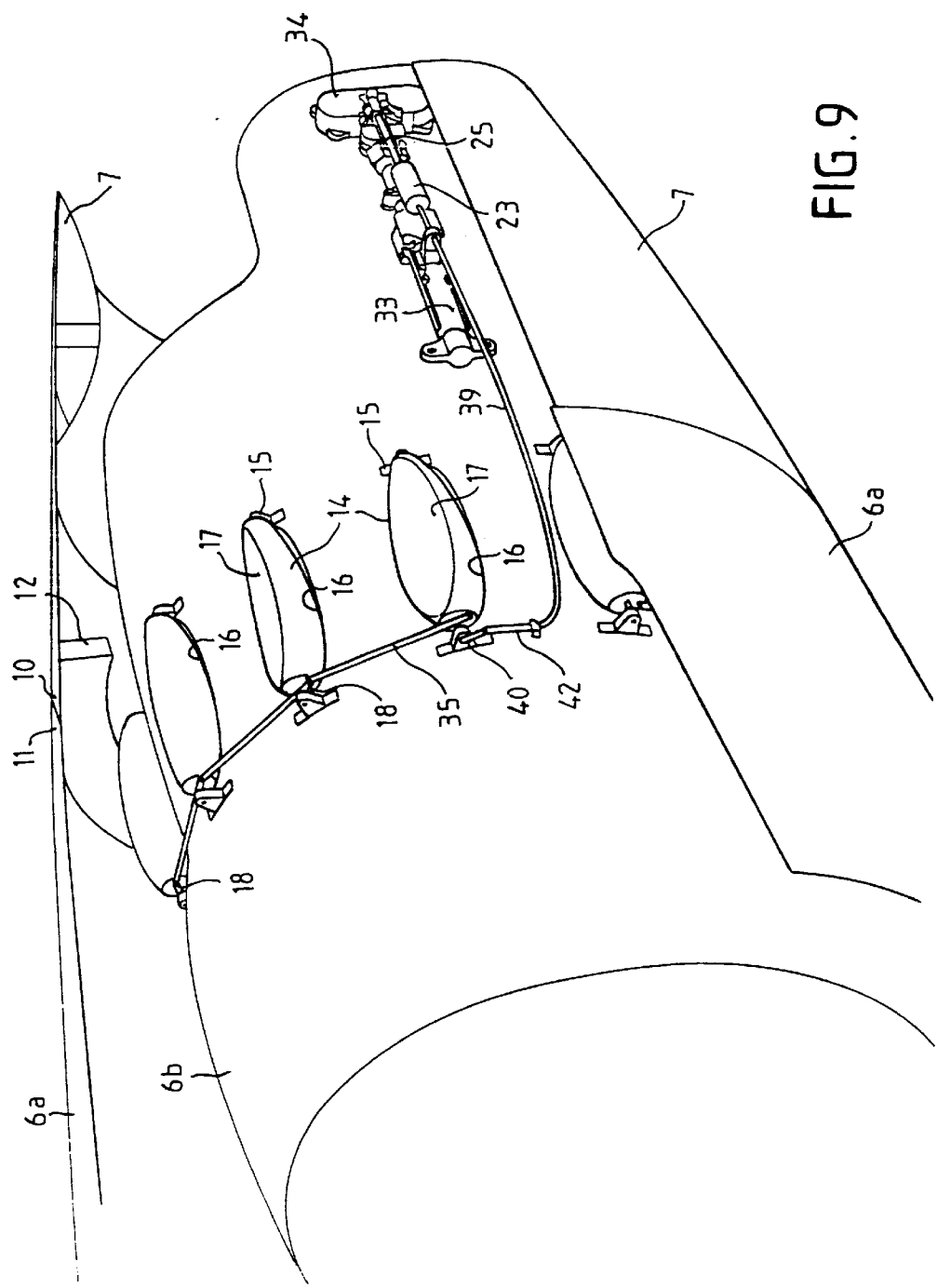
FIG. 9 is a diagrammatic perspective view, with cut away, of the rear part of said jet engine, showing the device for mechanical coupling between the rotary bodies and the control for positioning the pivot pins of the reverser doors.
Figure 10:
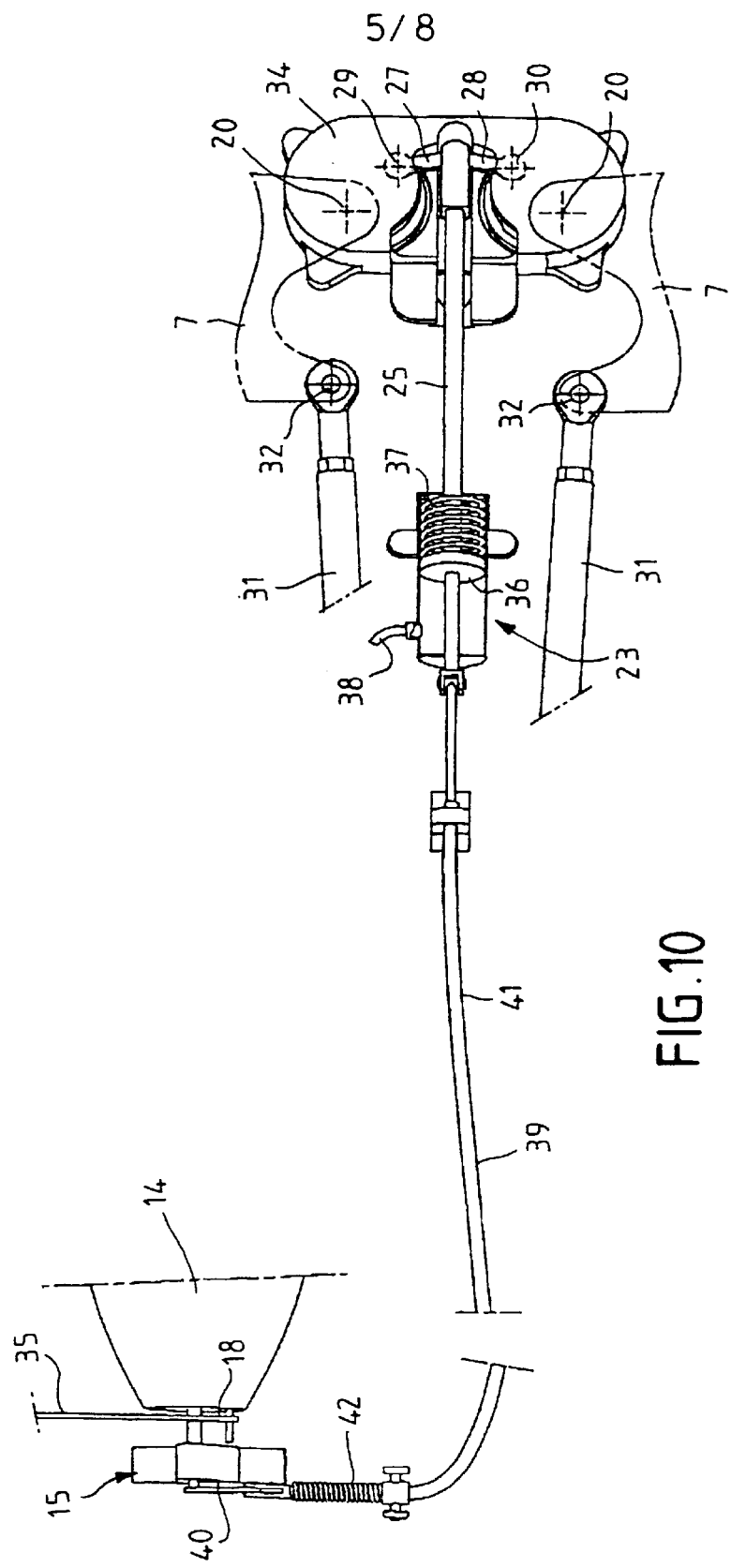
FIG. 10 illustrates said mechanical coupling in the case of the position for cruising flight.
Figure 12:
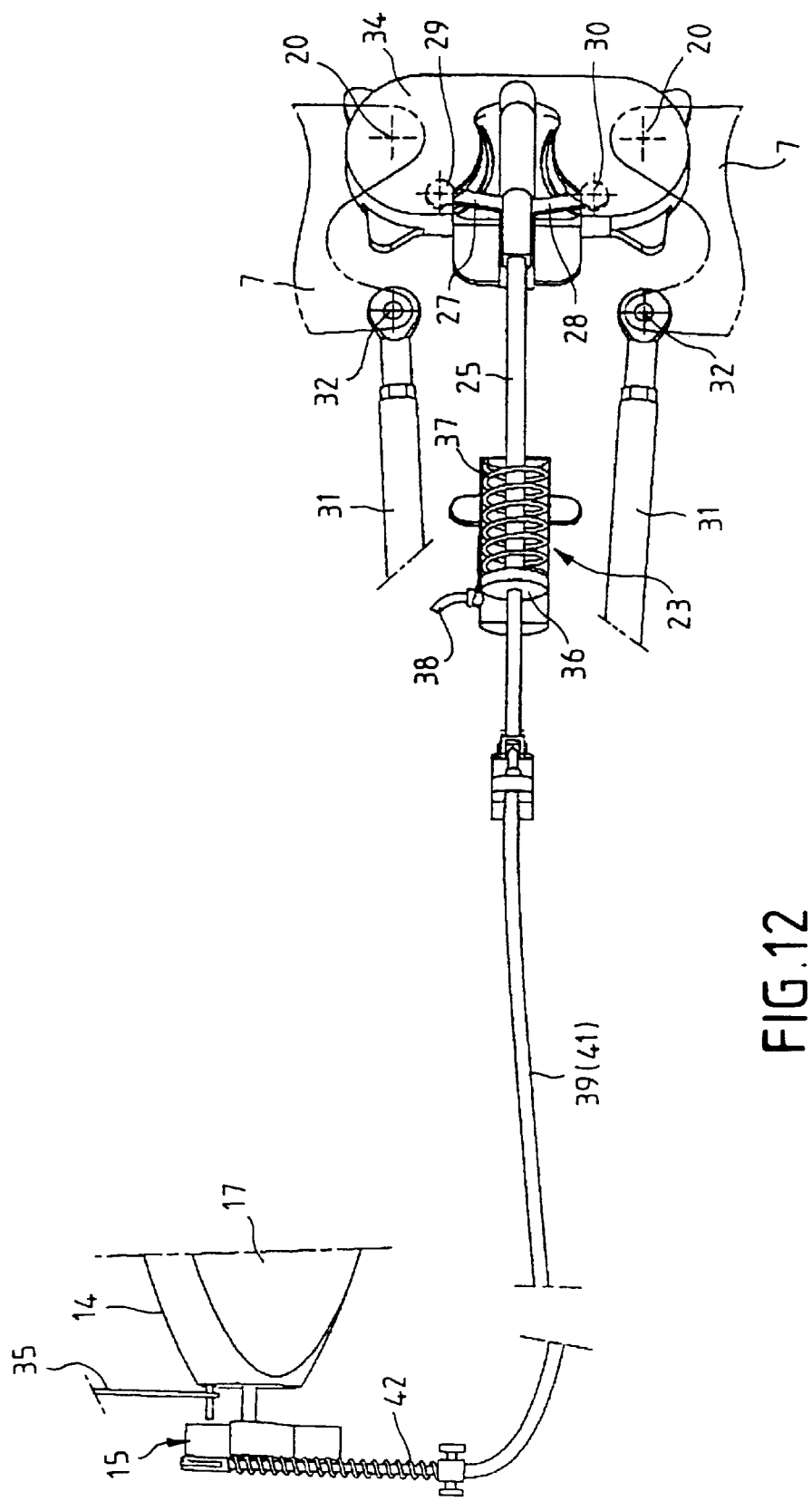
FIG. 12 illustrates said mechanical coupling in the case of the positions for taking-off and landing (and in the case of the thrust reversal position, the components being positioned in more or less the same way).

Illustrated in FIGS. 9, 10 and 12 is one method of achieving the mechanical coupling between the reverser doors 7 and the shaped rotary bodies 14. Here it has been assumed that the two rotary pivot holders 21 operated by a jack 23 were contained in a casing 34. In addition, in FIG. 9, the connecting rods 31 actuated by the main jack 33 have not been depicted, while in FIGS. 10 and 12 said main jack 33 has not been shown.

Figure 11:
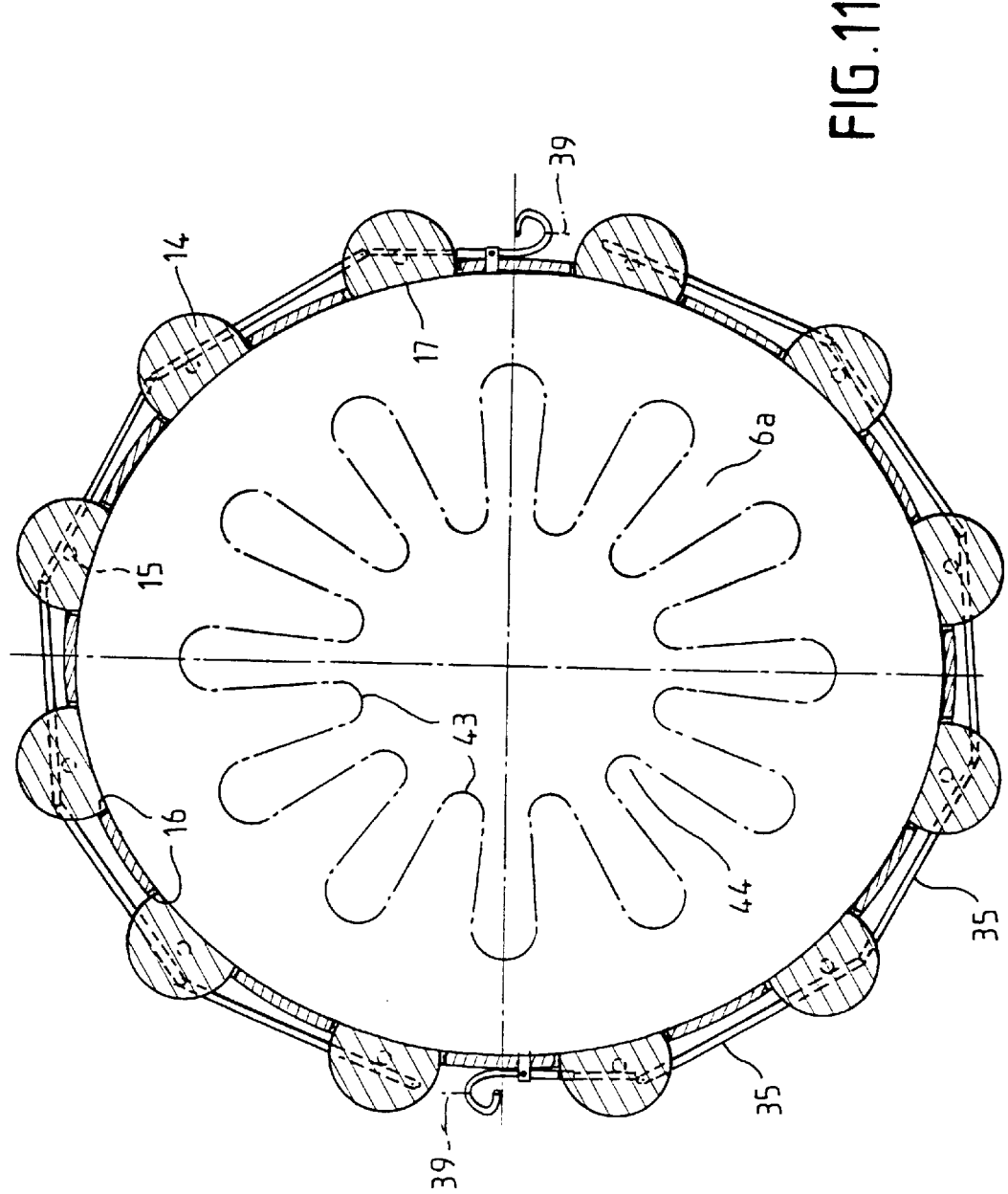
FIG. 11 is a diagrammatic view of the rear of the jet engine, said rotary bodies being in the position that corresponds to cruising flight.

The shaped rotary bodies 14 are distributed around the periphery of the inner skin 6b and form a chain in which they are connected together by bars 35. Each bar 35 is articulated in an eccentric fashion, at both ends, to two consecutive shaped rotary bodies. Thus all that is required is for one rotary body 14 in the chain to be pivoted, for this to make all of the bodies of which said chain is formed pivot. In actual fact, as can be seen in FIGS. 11 and 13, said rotary bodies form two chains, each occupying half the periphery of the inner skin 6b and being actuated from a casing 34 on one of the two sides of the reverser, with which an auxiliary jack 23 is associated.

As can be seen, each auxiliary jack 23 comprises two chambers separated by a piston 36, secured to the rod 25. On that one of said chambers which is on the same side as said rod 25, there is a compression spring 37, while a pressurized-fluid feed orifice 38 is made in the other chamber.

Furthermore, on the side that does not contain the rod 25, the piston 36 is secured to a pull cable 39, connected to a body 14 at the end of a chain by a crank 40. The cable 39 is surrounded by a sheath 41 and, between said crank 40 and the corresponding end of said sheath 41 there is another compression spring 42 surrounding the bared end of said cable.

When pressurized fluid is let into the jack 23 through the orifice 38 and when the main jack 33 is inactive, the piston 36 is pushed back against the action of the compression spring 37, which becomes compressed, and the jack rod 25 adopts its deployed position, as is illustrated in FIG. 6. At the same time, the cable 39 is pulled by the piston 36 and forces the rotary bodies 14 of the chain to which it is connected to adopt their retracted position, while at the same time compressing the spring 42 (see FIGS. 10 and 11).

The jet engine according to the invention is therefore in the cruising position illustrated in FIGS. 1 and 2.

If now no pressurized fluid is let into the jack 23 and if the main jack 33 is inactive, the piston 36 will be pushed back by the compression spring 37, the jack rod 25 is retracted (as is shown in FIG. 7) and the compression spring 42 pushes the rotary bodies 14 into their deployed position (see FIG. 13).

The jet engine according to the invention is then in the take-off and landing position illustrated in FIGS. 3 and 4.

If, starting from this latest position, the doors 7 are pushed backward by the jacks 33 and the connecting rods 31, the coupling adopts the configuration illustrated in FIG. 12, the rotary bodies 14 remaining deployed (FIG. 13) because the cable 39 remains tensioned and in the same position.

The jet engine according to the invention therefore finds itself in the position for unlatching and deploying the reverser doors 7, which position is illustrated by FIG. 5.

If, as shown in FIGS. 11 and 13, the wall of the central generator 1 comprises means of mixing the hot and cold streams, which means consist of peripheral convolutions 43 forming between them passages 44 for guiding the stream of cold gas toward the stream of hot gas, it is advantageous for each of said shaped rotary bodies 14 to lie facing one of said guide passages.

From the foregoing description it can be seen that it is easy to change from the take-off position into the cruise position, then from the cruise position into the landing position and from the latter position to the thrust-reversal position in order thereafter to return to the landing position or the cruise position.

I claim:

1. A bypass jet engine with confluent nozzle for an aircraft:
   - comprising a central generator (1) which through its outlet orifice (2) emits a stream of hot gas, and annular bypass duct (4) which surrounds said central generator and through which a stream of relatively cold gas passes, said streams of hot and cold gas being freely confluent inside said nozzle, which extends said annular duct beyond the outlet orifice of said central generator to form a convergent nozzle, said annular bypass duct defining the confluence cross section in a plane of the outlet orifice (2) of the central generator;

equipped with a thrust reverser comprising:
     at least two reverser doors (7), each of which is mounted so that it can pivot about a pivot pin (20) which is transverse to said streams from the jet engine and which is arranged close to the outlet orifice (9) of said confluent nozzle, so that each reverser door can occupy either a folded position in which said reverser door forms part of the cowling of said jet engine or part of the aircraft fuselage, or a deployed position in which said reverser door is arranged transversely to said streams, said reverser doors in the folded position forming at least that part of said confluent nozzle which is adjacent to its outlet orifice; and
     actuating means (31, 33) to make said reverser doors simultaneously adopt either their folded position or their deployed position; and comprising:
     controlled means (14) arranged at the periphery of said confluent nozzle, adjacent to the mouth of said annular bypass duct (4) and inside this nozzle, to vary said confluence cross section;
     means (23) for shifting the transverse pivot pins (20) of said reverser doors-both together and radially to said streams-when these doors are in the folded position, so as to vary the cross section of the outlet orifice (9) of said confluent nozzle, said means (23) of shifting the transverse pivot pins (20) of the reverser doors (7) reducing said cross section of the outlet orifice (9) of the nozzle when said controlled means (14) of varying the confluence cross section increase said confluence cross section and, conversely, increasing said cross section of the outlet orifice (9) of the nozzle when said controlled means (14) reduce said confluence cross section; and
     means (39) of mechanical coupling between said means (23) of shifting the transverse pivot pins (20) of the reverser doors (7) and said controlled means (14) of varying said confluence cross section, the action of said coupling means (39) being such that the confluence cross section is reduced when the cross section of the outlet orifice (9) of the nozzle increases, and vice versa.

2. The jet engine as claimed in claim 1, wherein said means (23) of shifting the transverse pivot pins (20) of the reverser doors (7) give these doors, in the folded position, two different stable positions, the first of which corresponds to a maximum cross section of nozzle outlet orifice (9) designed for take-off and landing, and the second of which corresponds to a minimum cross section of nozzle outlet orifice (9) designed for cruising flight, and wherein said controlled means of varying the confluence cross section (14) give said confluence cross section a minimum value in said first position designed for take-off and landing and a maximum value in said second position designed for cruising flight.

3. The jet engine as claimed in claim 2, wherein along a longitudinal axis (X—X) of said jet engine, said first position is part way between said second position and a pulled back deployed position of said reverser doors (7).

4. The jet engine as claimed in claim 2, in which said reverser doors (7) are brought, in order to deploy them, into a pulled back position in which radial stop means (11) designed to interact with the front end (10) of said doors (7) to prevent them from deploying, become inactive, wherein said radial stop means (11) are designed to allow the transverse pivot pins (20) to be shifted between said first and second positions.

5. The jet engine as claimed in claim 4, wherein said radial stop means are formed, on the one hand, by the front edge (10) of said reverser doors (7) and, on the other hand, by the rear edge (11) of the upstream part of said jet engine, said front edge of the doors being designed to fit at least locally under said rear edge of said upstream part of the engine.

6. The jet engine as claimed in claim 2, wherein said first take-off and landing position, said second, cruising flight, position, and said pulled back position correspond, for each reverser door (7), to three angular positions of the corresponding two pivot holders (21) about their rotation spindles.

7. The jet engine as claimed in claim 1, wherein said controlled means of varying the confluence cross section consist of a number of individually shaped rotary bodies (14) distributed around the periphery of said annular bypass duct (4) and which can adopt either a retracted position, in which the individual shaped rotary bodies (14) are continuous within the thickness of the outer wall (6) of said annular duct, or a deployed position in which they project into said annular duct (4).

8. The jet engine as claimed in claim 7, wherein the confluent nozzle comprises means of mixing the hot and cold streams, which means consist of convolutions (43) made at the periphery of the exhaust nozzle of the central generator and each pair forming between them a passage (44) for guiding gas from the cold stream toward the hot stream, wherein, in the deployed position, each of said individual moving bodies (14) comes to face one of said guide passages (44).

9. The jet engine as claimed in claim 1, wherein said means of mechanical coupling comprise at least one pull cable (39).

10. The jet engine as claimed in claim 1, wherein said means (23) of shifting the pivot pins (20) of the reverser doors (7) and said means of mechanical coupling act against elastic means (37, 42) pressing said reverser doors (7) toward said first position and said moving bodies toward their deployed position.

11. The jet engine as claimed in claim 1, wherein said means of shifting the transverse pivot pins (20) of the reverser doors (7) comprise, for each reverser door, two rotary pivot holders (21) each held by a rotation spindle (22) secured to the jet engine and each carrying an eccentric pivot, the two pivots of said pivot holders being aligned to define the transverse pivot pin (20) for the corresponding reverser door (7).

* * * * *